United States Patent
Khairnar et al.

(10) Patent No.: US 11,784,474 B2
(45) Date of Patent: Oct. 10, 2023

(54) CABLE TRAY ASSEMBLY

(71) Applicant: Eaton Intelligent Power Limited, Dublin (IE)

(72) Inventors: Lalit Subhash Khairnar, Akurdi (IN); Jacob Lee Johnson, New Baden, IL (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 8 days.

(21) Appl. No.: 17/445,445

(22) Filed: Aug. 19, 2021

(65) Prior Publication Data

US 2022/0060007 A1   Feb. 24, 2022

Related U.S. Application Data

(60) Provisional application No. 63/067,976, filed on Aug. 20, 2020.

(51) Int. Cl.
*F16L 3/00* (2006.01)
*H02G 3/04* (2006.01)
*H02G 3/06* (2006.01)

(52) U.S. Cl.
CPC ......... *H02G 3/0456* (2013.01); *H02G 3/0437* (2013.01); *H02G 3/0608* (2013.01)

(58) Field of Classification Search
None
See application file for complete search history.

(56) References Cited

U.S. PATENT DOCUMENTS

| | | | |
|---|---|---|---|
| 9,024,188 B2 | 5/2015 | Lacey, Jr. et al. | |
| 2012/0292266 A1* | 11/2012 | Smith | H02G 3/0608 211/13.1 |
| 2013/0264433 A1* | 10/2013 | Smith | H02G 3/0608 29/525.01 |
| 2015/0001352 A1* | 1/2015 | Kellerman | H02G 3/0608 248/68.1 |
| 2016/0006227 A1* | 1/2016 | Tally | H02G 3/0608 403/188 |
| 2018/0231038 A1* | 8/2018 | Shelton | F16B 7/0426 |
| 2019/0089141 A1* | 3/2019 | Combes | H02G 3/0608 |
| 2021/0231146 A1* | 7/2021 | Shelton | H02G 3/0608 |

FOREIGN PATENT DOCUMENTS

ES    1203811 U  *  1/2018   ............... H02G 3/04

* cited by examiner

*Primary Examiner* — Steven M Marsh
(74) *Attorney, Agent, or Firm* — Stinson LLP

(57) ABSTRACT

A cable tray assembly includes first and second cable tray sections each including a base and rails extending transversely from longitudinal sides of the base. At least one of the base and the rails defines a plurality of holes. A splice plate is configured to engage the first and second cable tray sections for attaching the first cable tray section to the second cable tray section. The splice plate defines a plurality of holes. At least one snap-fit connector includes a head and a plurality of resiliently deflectable arms extending from the head. The arms of the connector are configured to extend through aligned holes in the splice plate and one of the cable tray sections to secure the splice plate to said one of the cable tray sections.

4 Claims, 24 Drawing Sheets

CABLE TRAY ASSEMBLY

CROSS-REFERENCE TO RELATED APPLICATION

This application claims priority to U.S. Provisional Patent Application Ser. No. 63/067,976, filed Aug. 20, 2020, and which is hereby incorporated by reference in its entirety.

FIELD OF THE DISCLOSURE

The present disclosure generally relates to cable tray assemblies, and more particularly to cable tray assemblies including cable trays, connectors and splice plates.

BACKGROUND OF THE DISCLOSURE

A ladder-type cable tray is used by industry to support electrical cable, for example. A length or section of ladder cable tray comprises a pair of side rails connected by cable-supporting rungs extending between the rails at intervals along the tray. Cable tray sections and fittings are spliced together using screw-type fasteners and splice plates to form a cable tray assembly.

SUMMARY

In one aspect, a cable tray assembly generally comprises first and second cable tray sections each including a base and rails extending transversely from longitudinal sides of the base. At least one of the base and the rails defines a plurality of holes. A splice plate is configured to engage the first and second cable tray sections for attaching the first cable tray section to the second cable tray section. The splice plate defines a plurality of holes. At least one snap-fit connector comprises a head and a plurality of resiliently deflectable arms extending from the head. The arms of the connector are configured to extend through aligned holes in the splice plate and one of the cable tray sections to secure the splice plate to said one of the cable tray sections.

In another aspect, a connector for use in a cable tray assembly generally comprises a head and a plurality of resiliently deflectable arms extending from the head. The arms include a planar extension section extending orthogonally from the head and a hook section extending laterally from the planar extension section.

In yet another aspect, a cable tray assembly generally comprises a cable tray section including a base and rails extending transversely from longitudinal sides of the base. At least one of the rails includes a retainer projecting laterally on the rail. A splice plate is configured to engage the retainer on the cable tray section such that the splice plate is retained to the cable tray section by the retainer. A connector is configured to attach the splice plate to the cable tray section.

BRIEF DESCRIPTION OF THE DRAWINGS

Corresponding reference characters indicate corresponding parts throughout the drawings.

DETAILED DESCRIPTION OF THE DISCLOSURE

Figure 1:
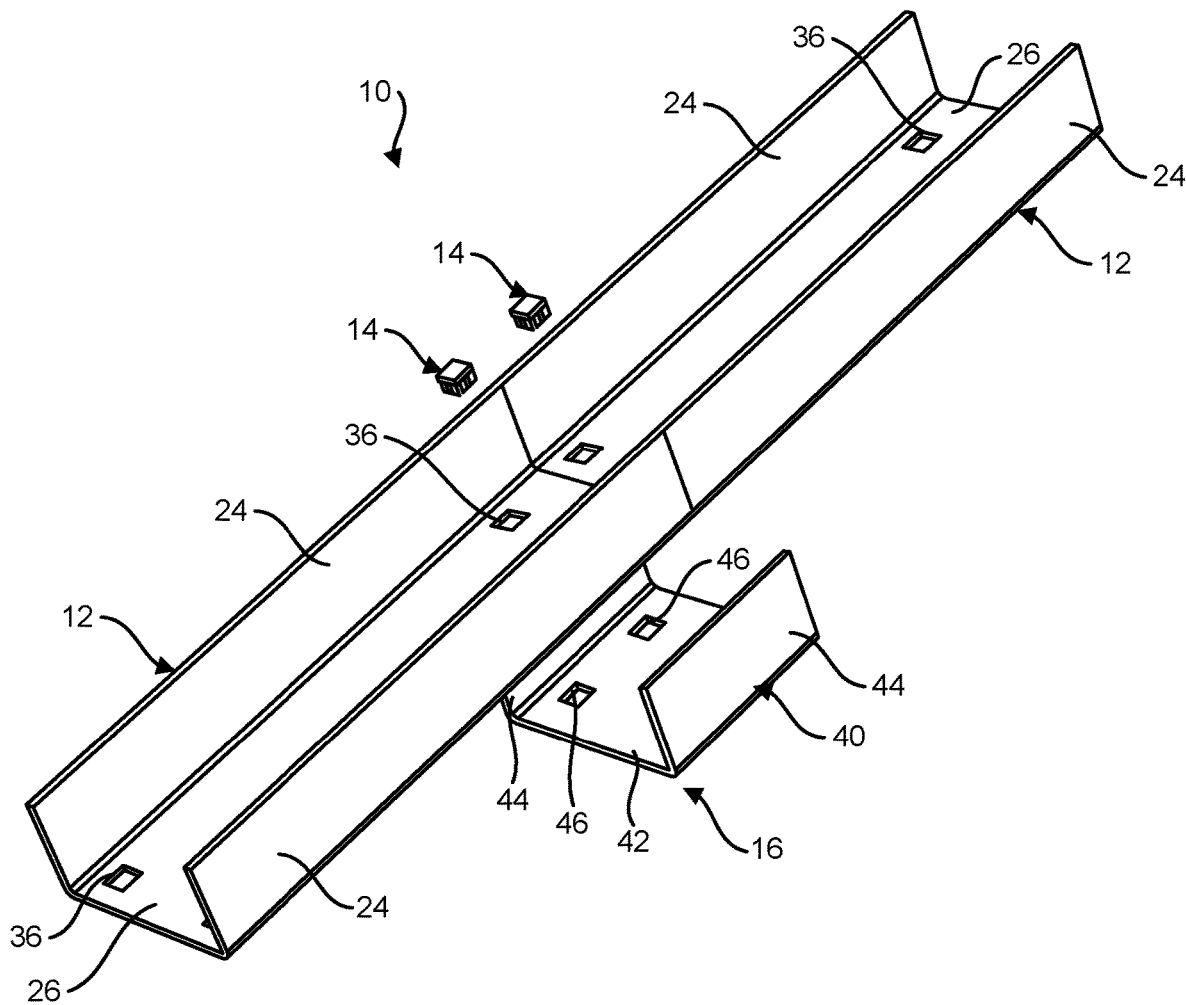
FIG. 1 is a partially exploded view of a cable tray assembly including cable tray sections, a splice plate, and connectors.

Referring now to the drawings, and in particular to FIG. 1, a cable tray assembly constructed according to the teachings of the present disclosure is generally indicated at reference numeral 10. The cable tray assembly includes cable tray sections, generally indicated at 12 (two are shown in the illustrated embodiment), a splice plate, generally indicated at 16, and connectors 14 configured to attach the splice plate to the cable tray sections for connecting the cable tray sections together. As used herein, terms denoting relative locations and positions of components and structures, including but not limited to "upper," "lower," "left," "right," "front," and "rear," are in reference to the cable tray assembly 10 in a horizontal orientation. It is understood that these terms are used for ease of description and not meant in a limiting sense. It is understood that the cable tray assembly 10 may be in a vertical orientation in the field, whereby the relative locations and positions of the components and structures would be different than as shown in the drawings. As used herein, the term "inboard" means toward or in the interior of the cable tray sections 12 and/or cable tray assembly 10. As used herein, the term "outboard" means away from the interior or at the exterior of the cable tray sections 12 and/or cable tray assembly 10.

Each cable tray section 12 includes two parallel rails, generally indicated at 24, (e.g., straight rails) forming the sides of the cable tray sections, and a web or base 26 extending between the rails 24. Each rail 24 has a generally planar configuration. However, each rail 24 may have other configurations without departing from the scope of the disclosure. In the illustrated embodiment, the rails 24 and base 26 are formed integrally. However, the rails 24 and base 26 could be formed separately and attached together by suitable means. Pre-formed fastener holes 36 (e.g., square or rectangular shaped openings) are defined by the base 26 adjacent opposite ends of the base for use in connecting the splice plate 16 to the cable tray sections 12, as will be described. In the illustrated embodiment, the holes 36 are disposed near the ends of the base 26 and adjacent the rails 24. The holes 36 at each end are aligned longitudinally along the base 26. Two holes 36 are formed at each end of the base 26. However, other numbers of holes, and holes being located in other positions are envisioned without departing from the scope of the disclosure. The length of each manufactured cable tray section 12 may also vary (e.g., from 10-30 feet). Sections 12 are often cut to fit in the field to varying lengths.

The splice plate 16 includes a plate body 40 having a generally channel shape including a planar base 42 and a pair of planar flanges 44 extending transversely from longitudinal sides of the base. In the illustrated embodiment, the flanges 44 extend generally orthogonally from the base 42. A length of the body 40 may be divided in half whereby one half of the body is configured to engage one of the cable tray sections 12 and the other half of the body is configured to engage the other of the cable tray sections when the splice plate 16 is attached to the sections by the connectors 14. The plate body 40 may be integrally formed as a single, one-piece, monolithically formed component. Alternatively, the plate body 40 may be formed from separate components attached together by suitable means.

Pre-formed fastener holes 46 (e.g., square or rectangular shaped openings) are defined by the base 42 of the splice plate 16 adjacent opposite ends of the base for use in connecting the splice plate to the cable tray sections 12. In the illustrated embodiment, the holes 46 are disposed near the ends of the base 42 and adjacent the flanges 44. The holes 46 at each end are aligned longitudinally along the base 42. Two holes 46 are formed at each end of the base 42. However, other numbers of holes, and holes being located in other positions are envisioned without departing from the scope of the disclosure. The holes 46 in the base 42 of the splice plate 16 can be aligned with corresponding holes 36 in the cable tray sections 12 so that the connectors 14 may be received through the holes to attach the splice plate to the cable tray sections.

Figure 2:
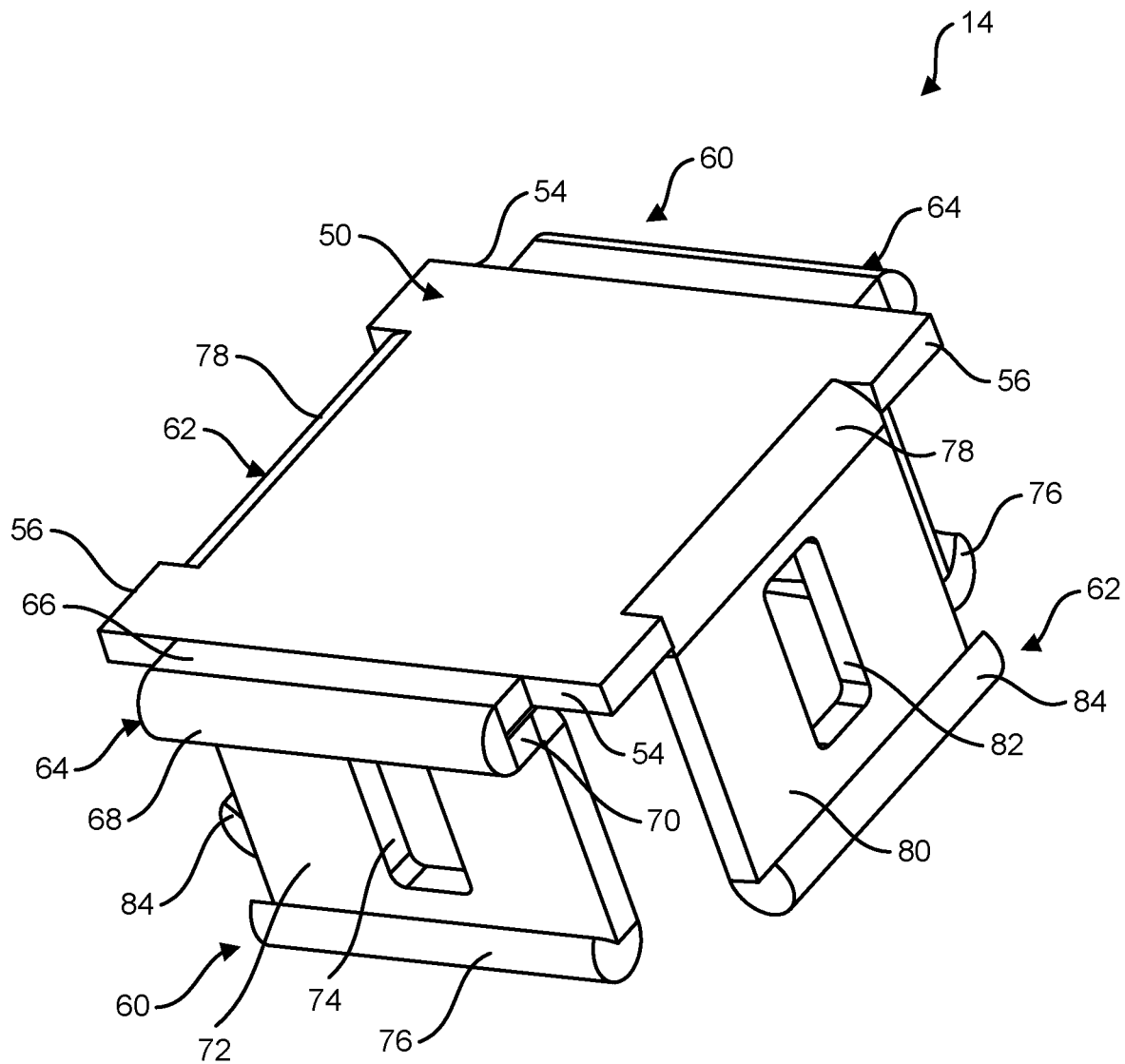
FIG. 2 is a perspective of a connector of the cable tray assembly.
Figure 3:
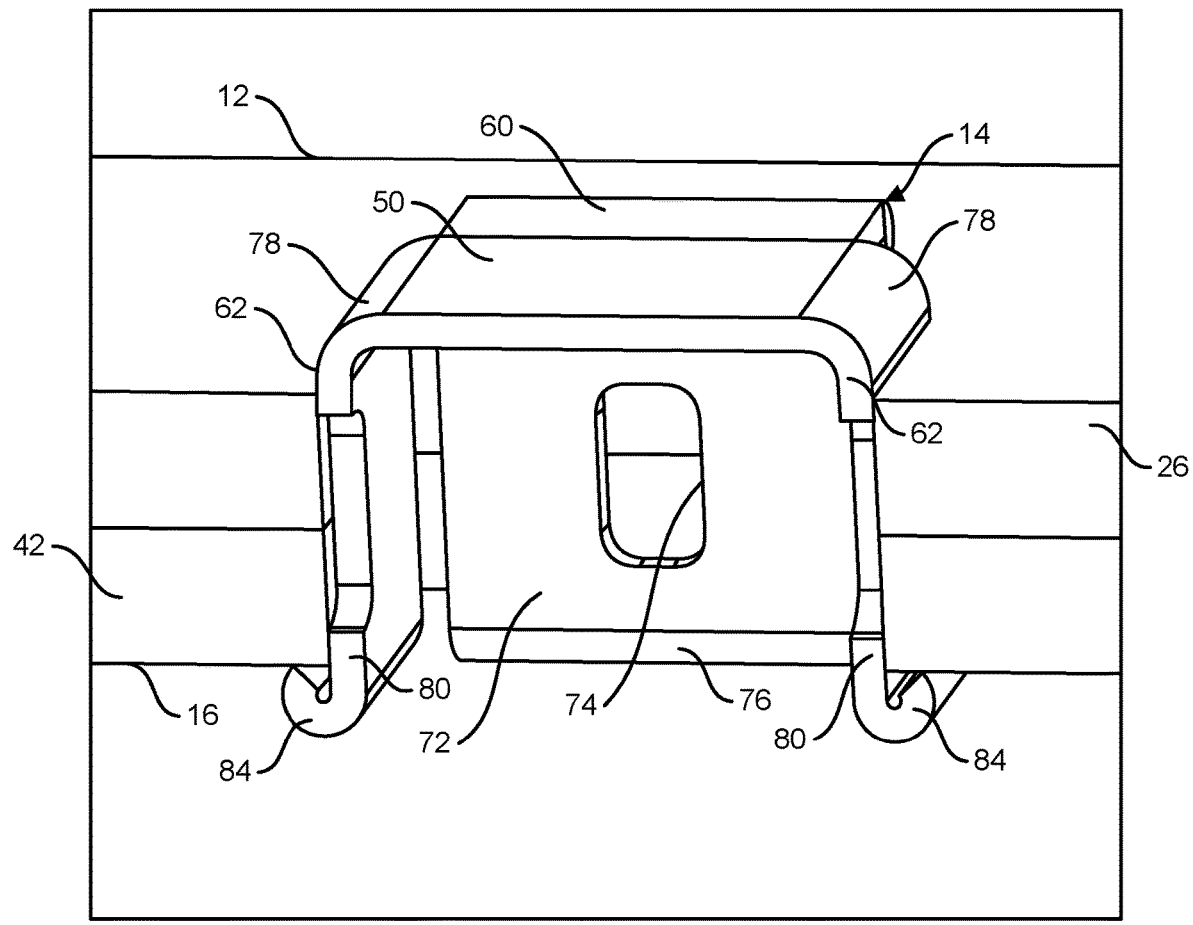
FIG. 3 is a cross-sectional view of the cable tray assembly showing a connector attaching the splice plate to a cable tray section.

Referring to FIGS. 2 and 3, each connector 14 comprises a head or base 50 and a plurality of resiliently deflectable arms 60, 62 extending from the base. In the illustrated embodiment, the base 50 comprises a planar body having a generally rectangular shape defining a first pair of opposing sides 54 and a second pair of opposing sides 56. However, the base 50 may have other configurations and shapes without departing from the scope of the disclosure. In one embodiment, the connector 14 comprises a snap-fit connector configured to secure the splice plate 16 to the cable tray sections 12 by pressing the connector into the holes 36, 46 in the splice plate and cable tray sections until the connector snaps into place securing the splice plate to the cable tray sections and thereby attaching the cable tray sections together. Thus, the connectors 14 facilitate attachment of the cable tray sections 12 together without the use of an additional tool (e.g., screwdriver, wrench, drill, etc.) as is required by thread-type fasteners (i.e., bolts, screws, etc.). In one embodiment, each connector 14 is a single, one-piece, monolithically formed component.

A first pair of arms 60 extend from the first pair of opposing sides 54 and a second pair of arms 62 extend from the second pair of opposing sides 56. The first pair of arms 60 each include an arch section 64 extending from one of the first opposing sides 54. A first linear portion 66 of the arch section 64 extends outward from the base 50 generally parallel to the base. A curved portion 68 of the arch section 64 curves downward from the first linear portion 66 to a second linear portion 70. The second linear portion is thus disposed below the first linear portion 66 and extends from the curved portion 68 toward the base 50 generally parallel to the first linear portion. An extension section 72 of the first arm 60 extends downward from the second liner portion 70 of the arch section 64. In the illustrated embodiment, the extension section 72 comprises a planar rectangular member and extends generally orthogonally to the base 50. However, the extension section 72 could have other configurations and extend in other directions without departing from the scope of the disclosure. In the illustrated embodiment, the extension section 72 defines an opening 74 extending through the extension section. The opening 74 has a rectangular shape. However, the opening 74 could have other shapes. The opening 74 increases the flexibility of the extension section 72 by removing portions of the material of the extension section. This facilitates flexing of the extension section 72 when the connector 14 is connected to the splice plate 16 and cable tray sections 12, as will be explained in greater detail below. However, the opening 74 can be omitted without departing from the scope of the disclosure. A hook section 76 extends from the extension section 72. The hook section 76 extends laterally away from the extension section 72 and curves upward to a free end to define a "hook" at the end of the first arm 60. In the illustrated embodiment, the hook section 76 extends laterally away from the base 50. However, the hook section 76 could extend toward the base 50 without departing from the scope of the disclosure.

The second pair of arms 62 each include an arc section 78 extending from one of the second opposing sides 56 of the base 50. The arc section 78 curves downward from the base 50 to an extension section 80. The extension section of the second arm 62 extends downward from the arch section 78. In the illustrated embodiment, the extension section 80 comprises a planar rectangular member and extends generally orthogonally to the base 50. However, the extension section 80 could have other configurations and extend in other directions without departing from the scope of the disclosure. In the illustrated embodiment, the extension section 80 defines an opening 82 extending through the extension section. The opening 82 has a rectangular shape. However, the opening could have other shapes. The opening 82 increases the flexibility of the extension section 80 by removing portions of the material of the extension section. This facilitates flexing of the extension section 80 when the connector 14 is connected to the splice plate 16 and cable tray sections 12, as will be explained in greater detail below. However, the opening 82 can be omitted without departing from the scope of the disclosure. A hook section 84 extends from the extension section 80. The hook section 84 extends laterally away from the extension section 80 and curves upward to a free end to define a "hook" at the end of the second arm 62. In the illustrated embodiment, the hook section 84 extends laterally away from the base 50. However, the hook section 84 could extend toward the base 50 without departing from the scope of the disclosure.

Additionally, while the first and second pairs of arms 60, 62 are shown as having different configurations, the arms could have the same configuration without departing from the scope of the disclosure. For instance, both the first and second pair of arms 60, 62 could have the configuration of the first pair of arms 60, or both pairs of arms could have the configuration of the second pair of arms 62. Alternatively, each arm in a pair 60, 62 may have a different configuration. Moreover, connectors having different configurations may be used within the same cable tray assembly 10. For example, both connector 14 and connector 14' (FIGS. 4 and 5) may be used with cable tray assembly 10.

Referring to FIGS. 1 and 3, in one method of assembling the cable tray assembly 10, the longitudinal ends of the cable tray sections 12 are brought together so that the rails 24 and bases 26 are generally abutted. The splice plate 16 is positioned on the cable tray sections 12 so that the splice plate at least partially received end portions of the cable tray sections within the channel of the splice plate body 40. The body of the splice plate 16 engages the cable tray sections 12 such that an inner or upper surface of the base 42 of the body lies flush against bottom portions of cable tray sections, and inner or inboard surfaces of the flanges 44 lie generally flush against the outboard faces of the rails 24 of the cable tray sections. The splice plate 16 is secured to the cable tray sections 12 by inserting the connectors 14 into the aligned holes 36, 46 in the cable tray sections 12 and splice plate 16.

During initial insertion of the connectors 14 into the holes 36, 46, the hook sections 76, 84 on the arms 60, 62 will engage the upper surface of the base 26 of a cable tray section 12, and the rounded shape of the hook sections will function as ramps to facilitate flexing of the arms inward to provide clearance for the arms to be inserted into the holes. Continued insertion of the connectors 14 will cause the hook sections 76, 84 to ride along the interior walls defining the holes 36, 46 until the hook sections clear the holes in the splice plate 16. The arms 60, 62 will then flex back to their natural state so that the hook sections 76, 84 will oppose the outer or lower surface of the spice plate 16. The second linear portions 70 of the arch sections 64 of the first pair of arms 60 will oppose the upper surface of the base 26 of the cable tray sections 12 functioning as stops to prevent the connectors 14 from being inserted out of the holes 36, 46. Thus, the connectors 14 hook around the outer surface of the splice plate 16 in a snap-fit manner to connect the splice plate to the cable tray sections 12. This connection process is therefore performed without the use of any additional tools which reduces the amount of time needed to complete the connection process.

Figure 4:
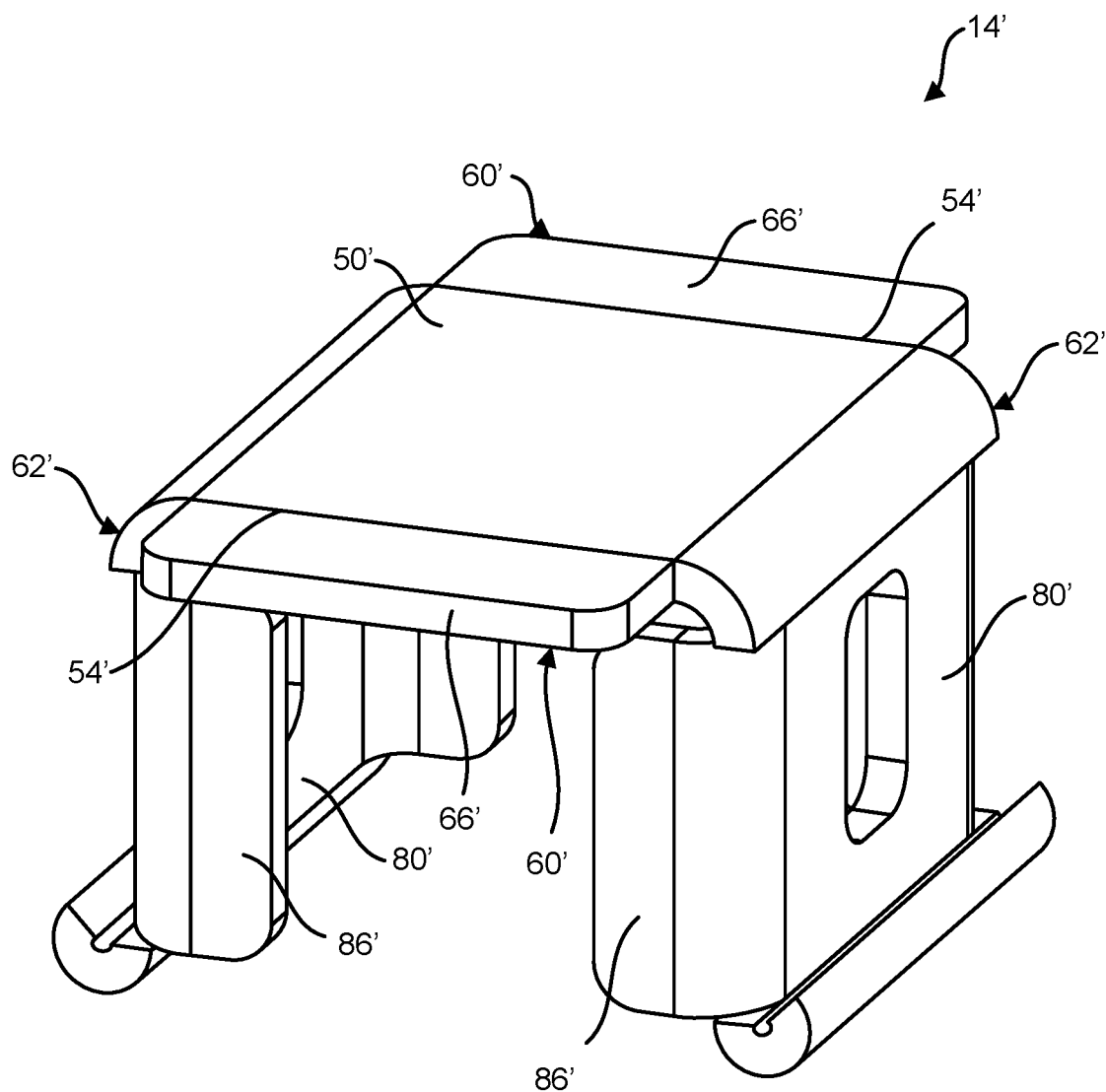
FIG. 4 is a perspective of another embodiment of a connector.
Figure 5:
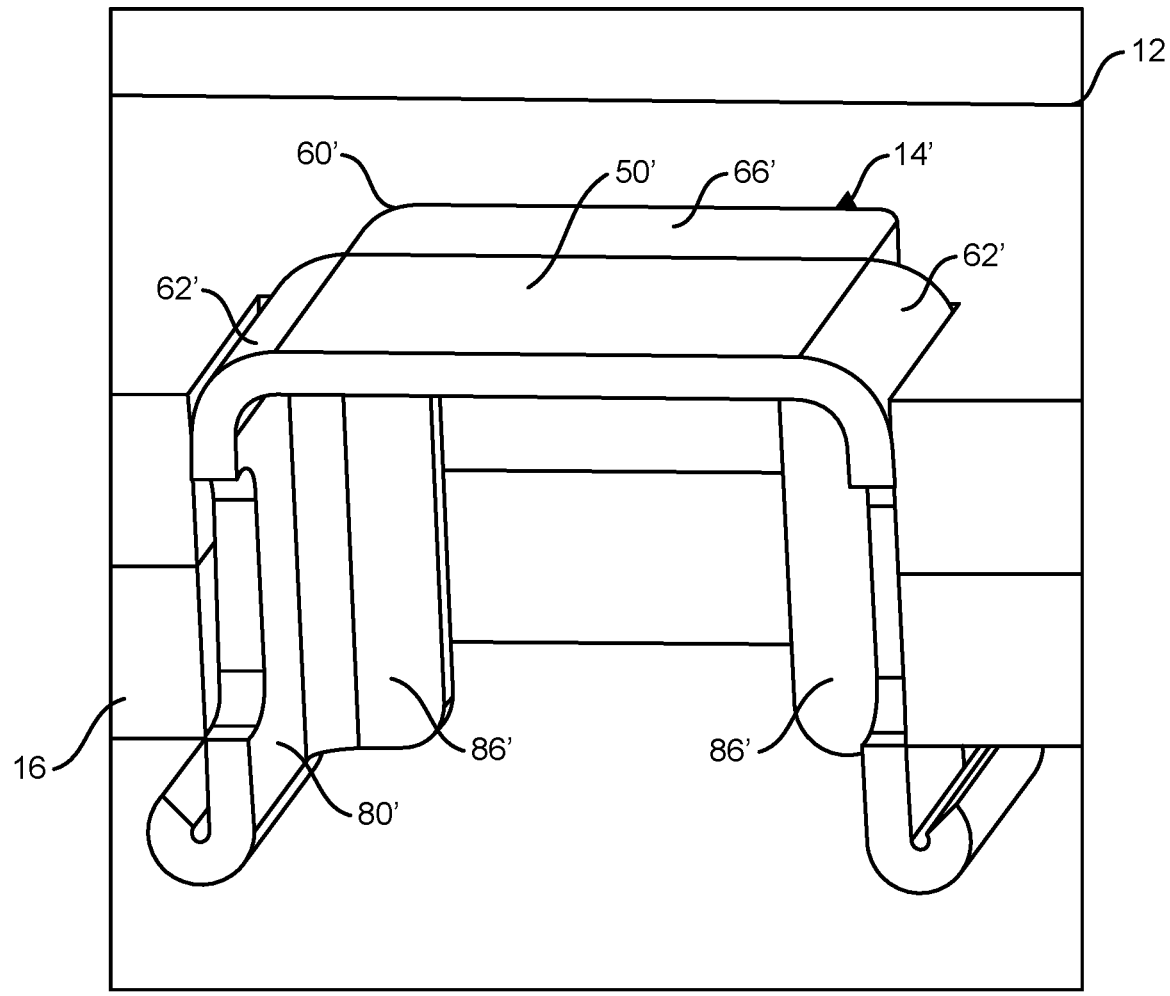
FIG. 5 is a cross-sectional view of a cable tray assembly showing the connector in FIG. 4 attaching a splice plate to a cable tray section.

Referring to FIGS. 4 and 5, a connector of another embodiment is generally indicated at 14'. The connector 14' is similar to the connector 14 of the previous embodiment. However, the first pair of arms 60 is replaced with first pair of arms 60' that comprise a planar member 66' that extends from first sides 54' of a base 50' generally parallel to the base. Also, the second pair of arms 62' include additional second extension sections 86' that extend transversely from both lateral sides of the first extension sections 80'. The second extension sections 86' extend toward the base 50'. The connector 14' otherwise functions substantially the same as connector 14. However, in this embodiment, the planar members 66' of the first pair of arms 60' will oppose the upper surface of the base 26 of the cable tray sections 12 to function as stops to prevent the connector 14' from being inserted out of the holes 36, 46.

Referring to FIGS. 6-12, a cable tray assembly of another embodiment is generally indicated at reference numeral 110. The cable tray assembly includes cable tray sections, generally indicated at 112 (two are shown in the illustrated embodiment), a splice plate, generally indicated at 116, and connectors 114 configured to attach the splice plate to the cable tray sections for connecting the cable tray sections together. The cable tray assembly 110 is similar to the cable tray assembly 10 of the previous embodiment. However, rails 124 of the cable tray sections 112 include a projection 190 (broadly, a retainer) extending along a length of the cable tray section. In particular, a projection 190 is formed on an exterior or outboard surface of each rail 124. In the illustrated embodiment, the projections 190 have a generally triangular shape. However, the projections 190 could have other shapes such as round or rectangular without departing from the scope of the disclosure. Pre-formed fastener holes 136 (e.g., round or oval shaped openings) are defined by a base 126 of each cable tray section 112 for use in connecting the splice plate 116 to the cable tray sections 112. In the illustrated embodiment, the holes 136 are arranged in uniformly spaced rows and columns across the base 126. However, other arrangements for the holes 136 are envisioned without departing from the scope of the disclosure.

The splice plate 116 is similar to splice plate 16 of the previous embodiment. Pre-formed fastener holes 146 (e.g., square or rectangular shaped openings) are defined by base 142 of the splice plate 116 for use in connecting the splice plate to the cable tray sections 112. In the illustrated embodiment, a pair of holes 146 are disposed near each side of the base 142 adjacent the flanges 144, and two pairs of holes are disposed near a center of the base. However, other numbers of holes 146, and holes being located in other positions are envisioned without departing from the scope of the disclosure. The holes 146 in the base 142 of the splice plate 116 can be aligned with corresponding holes 136 in the cable tray sections 112 so that the connectors 114 may be received through the holes to attach the splice plate to the cable tray sections. A notch 192 is formed in both flanges 144 of the splice plate 116. In the illustrated embodiment, the notches 192 are formed on an inner or inboard surface of the flange 144 and extend longitudinally along the length of the splice plate. The notches 192 have a generally triangular shape that is configured to mate with the projections 190 on the cable tray sections 112. Thus, the cable tray sections 112 can be received in the channel of the splice plate 116 such that the projections 190 are inserted into the notches 192 in the splice plate to temporarily retain the splice plate to the cable tray sections prior to the splice plate being attached to the sections by the connectors 114. It will be understood that the notches 192 could have other shapes and configurations without departing from the scope of the disclosure.

Figure 6:
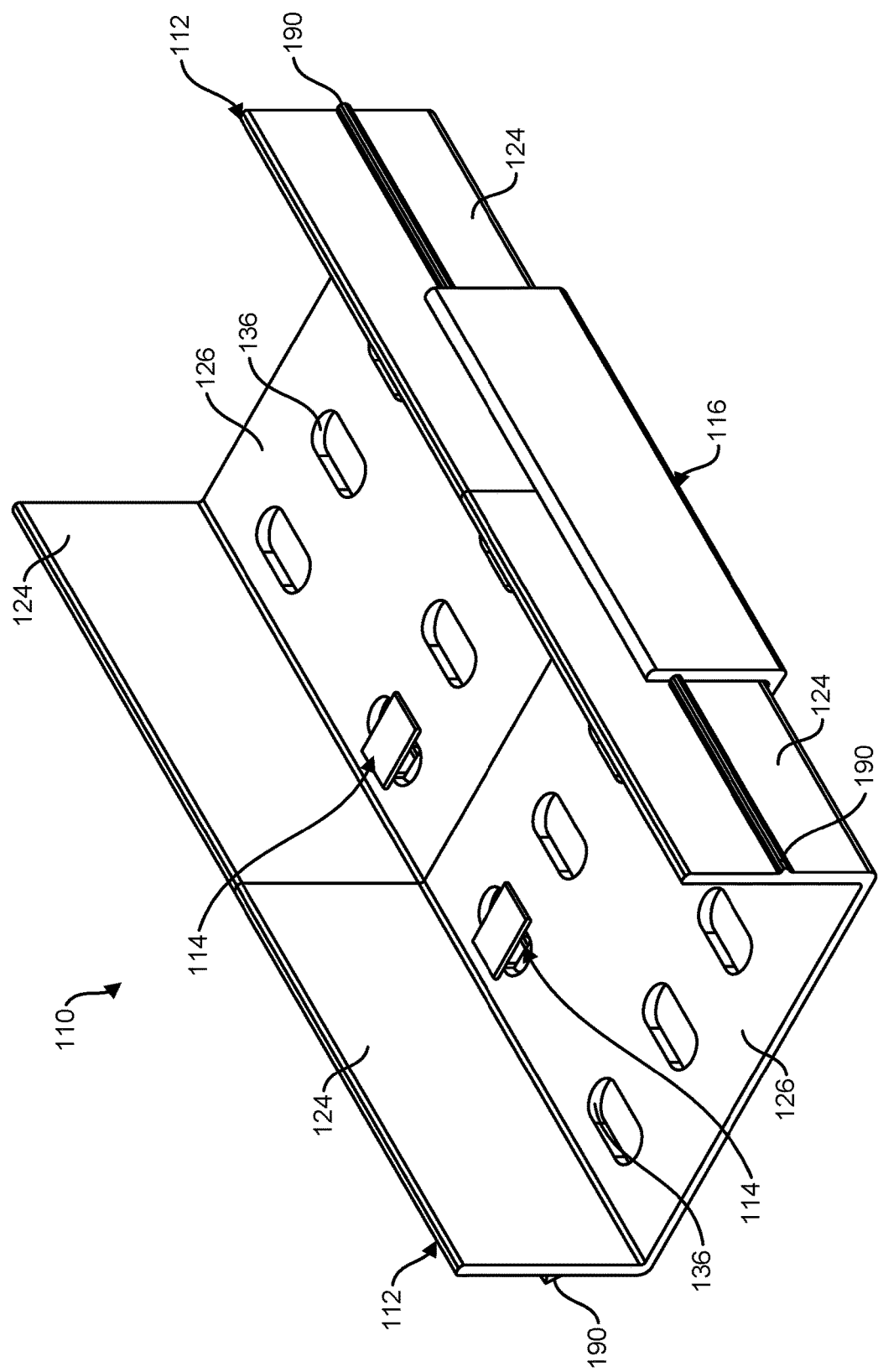
FIG. 6 is a perspective of another embodiment of a cable tray assembly.
Figure 7:
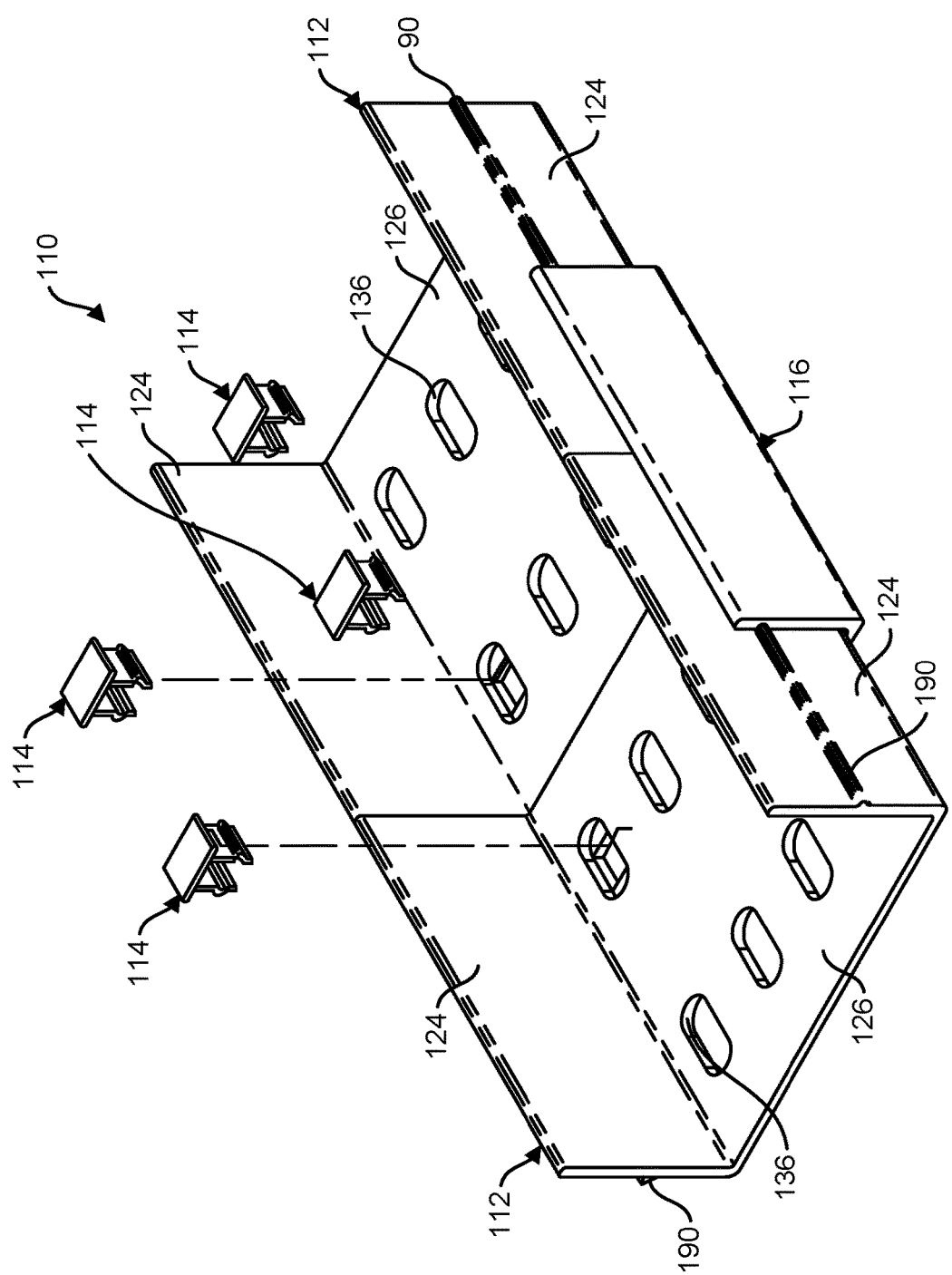
FIG. 7 is a partially exploded view of the cable tray assembly in FIG. 6.
Figure 8:
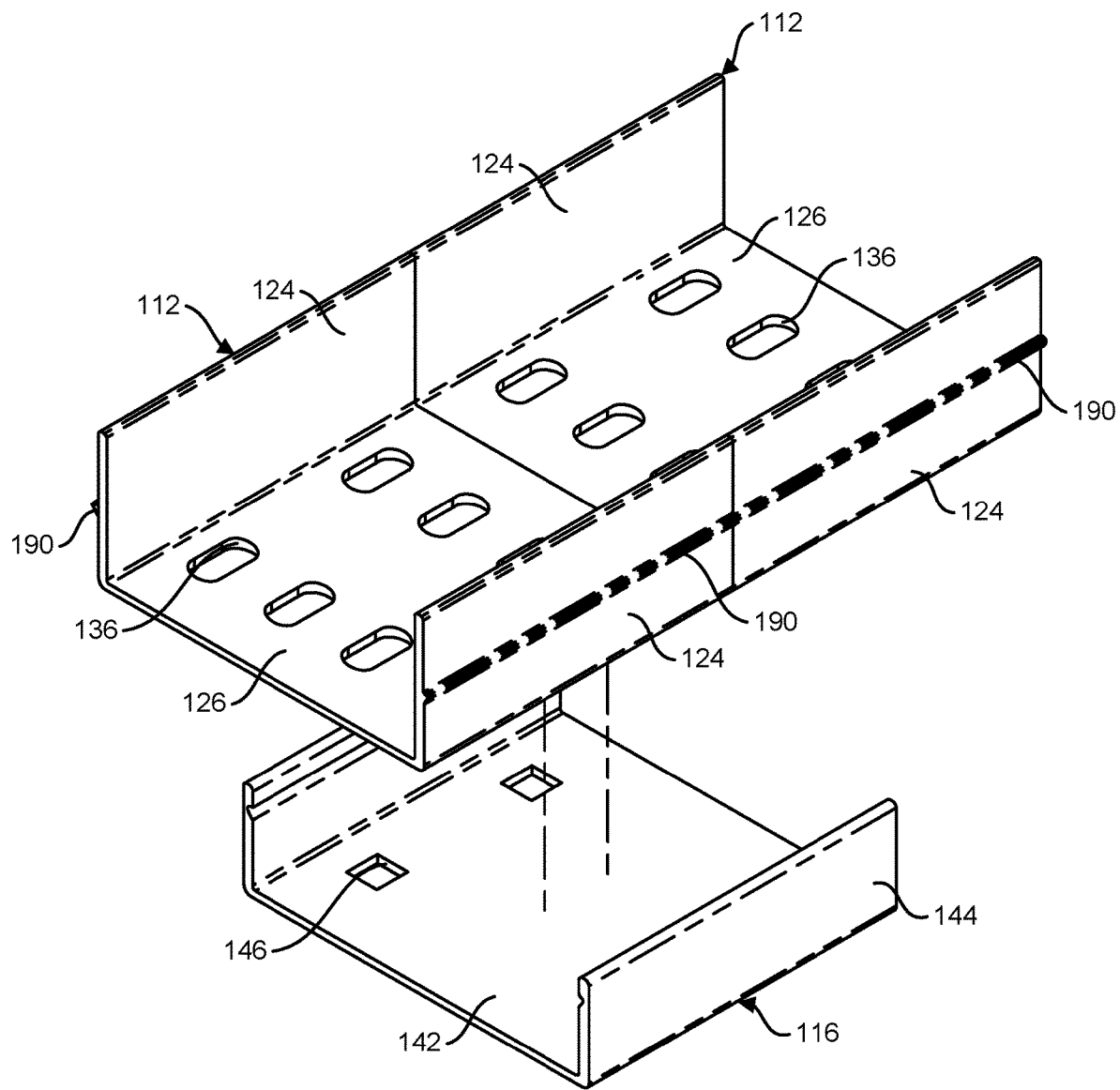
FIG. 8 is a partially exploded view of the cable tray assembly in FIG. 6 with connectors of the assembly removed.
Figure 9:
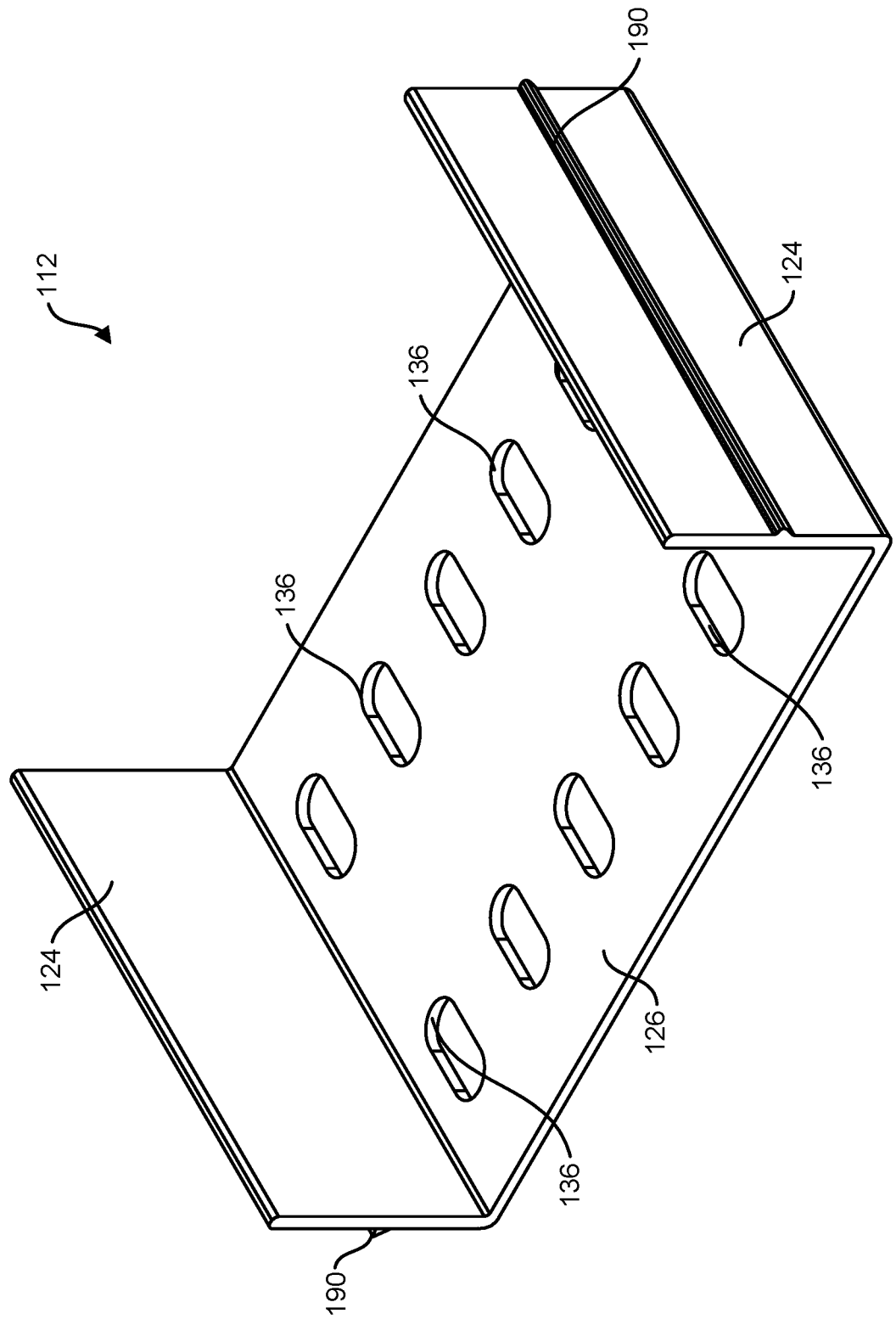
FIG. 9 is a perspective of a cable tray section of the assembly in FIG. 8.
Figure 10:
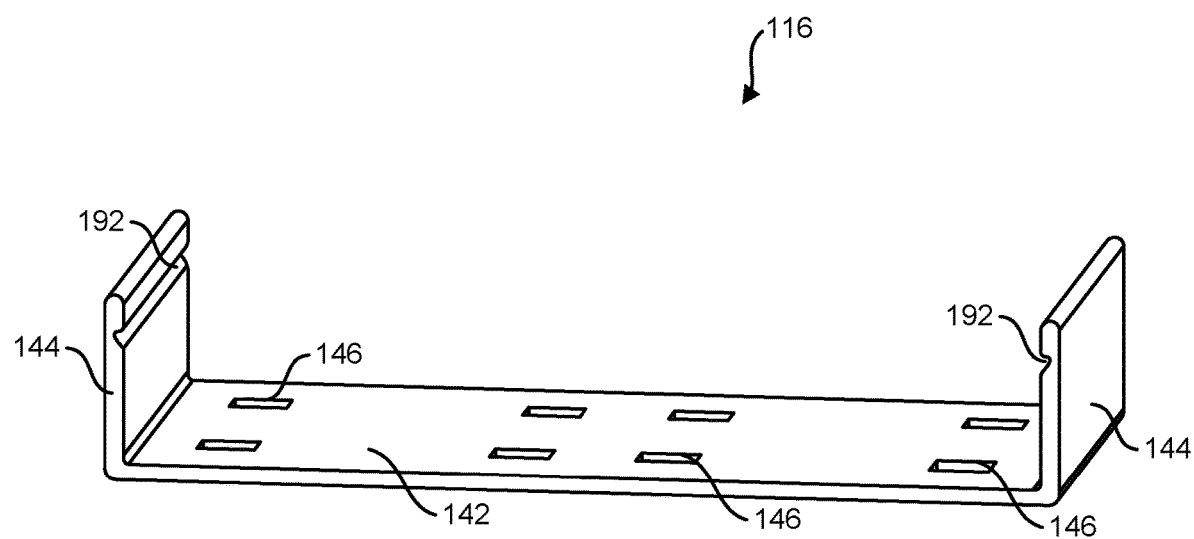
FIG. 10 is a perspective of a splice plate of the assembly in FIG. 8.
Figure 11:
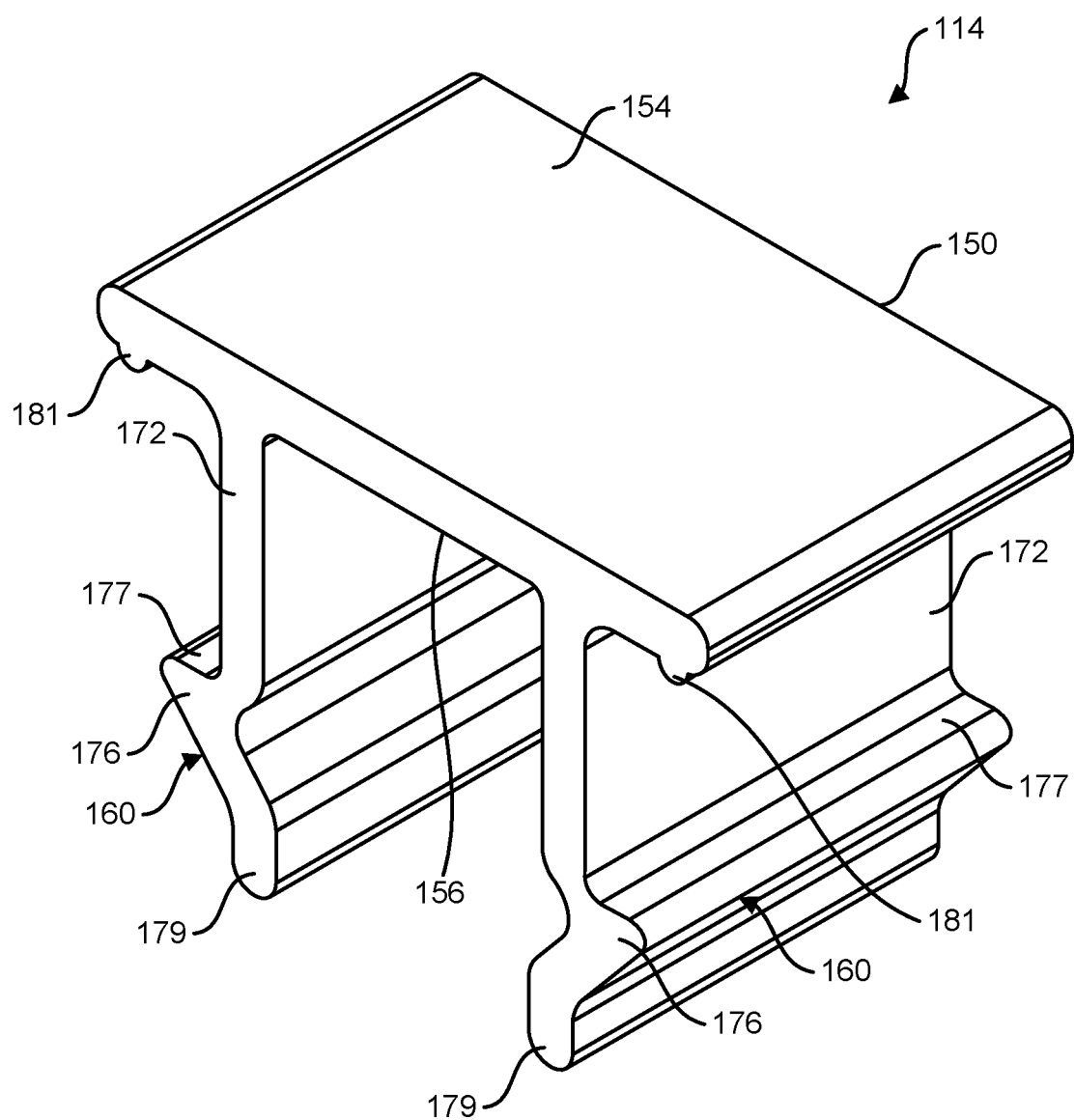
FIG. 11 is a perspective of a connector of the assembly in FIG. 8.
Figure 12:
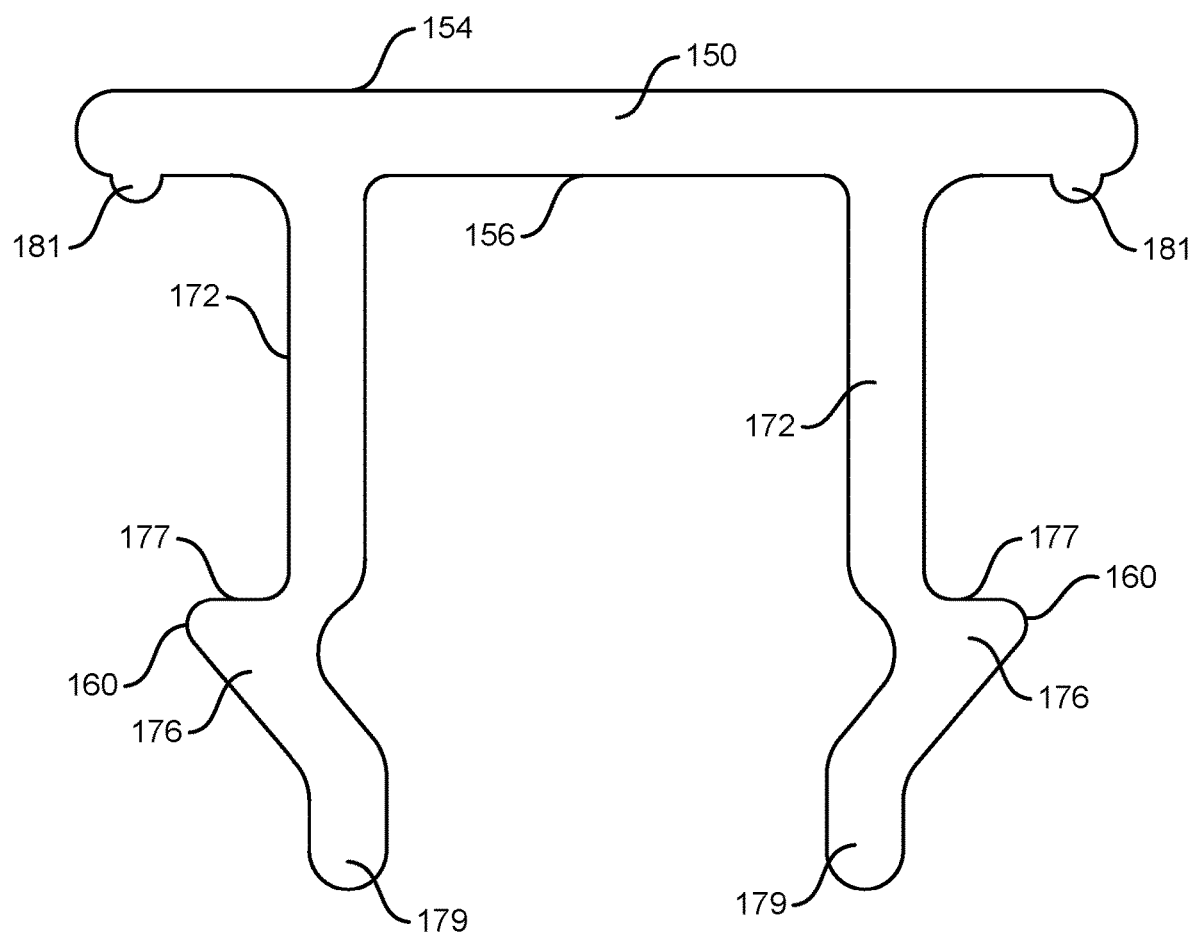
FIG. 12 is a side view of the connector in FIG. 11.
Figure 13:
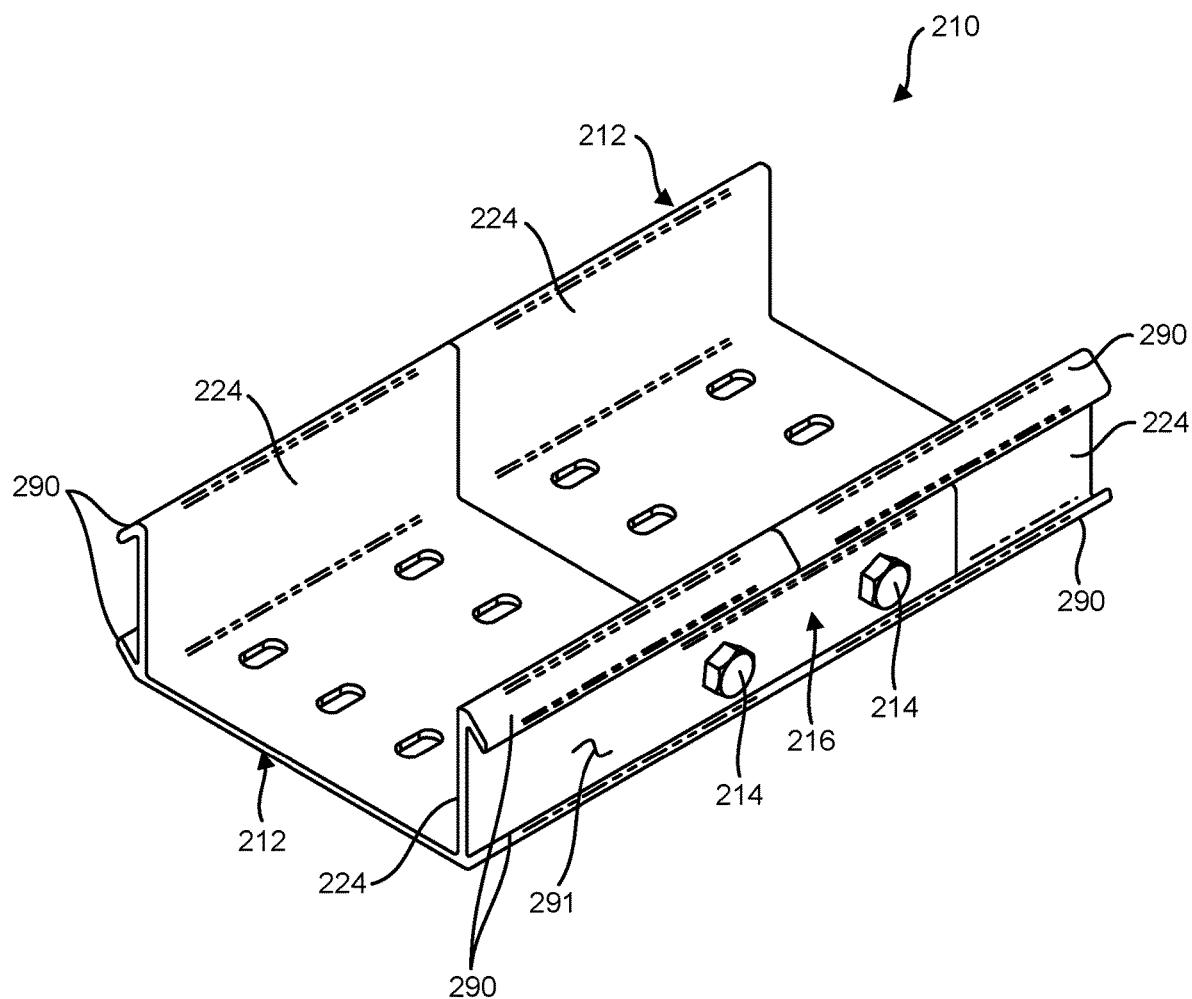
FIG. 13 is a perspective of a cable tray assembly of another embodiment.

Referring to FIGS. 6, 11, and 12, each connector 114 comprises a base 150 and a plurality of arms 160 extending from the base. In the illustrated embodiment, the base 150 comprise a planar body having a generally rectangular shape defining an upper surface 154 and a lower surface 156, as shown in the view of FIG. 12. However, the base 150 may have other configurations and shapes without departing from the scope of the disclosure. In one embodiment, the connector 114 comprises a snap-fit connector configured to secure the splice plate 116 to the cable tray sections 112 by pressing the connector into the holes 136, 146 in the splice plate and cable tray sections until the connector snaps into place securing the splice plate to the cable tray sections and thereby attaching the cable tray sections together. Thus, the connectors 114 facilitate attachment of the cable tray sections 112 together without the use of an additional tool (e.g., screwdriver, wrench, drill, etc.) as is required by thread-type fasteners (i.e., bolts, screws, etc.).

A pair of arms 160 extend from the lower surface 156 of the base 150. Each arm 160 includes a first extension section 172 extending downward from the lower surface 156 of the base 150. In the illustrated embodiment, the extension section 172 comprises a planar rectangular member and extends generally orthogonally to the base 150. However, the extension section 172 could have other configurations and extend in other directions without departing from the scope of the disclosure. A hook section 176 extends from the extension section 172. The hook section 176 extends laterally away from the extension section 172 and defines a "hook" on the arm 160. In the illustrated embodiment, the hook section 176 comprises a projection that defines a hook surface 177. The hook surface extends generally parallel to the upper and lower surfaces 154, 156 of the base 150. In the illustrated embodiment, the hook section 176, and hook surface 177 of the hook section, extends laterally from the first extension section 172 a shorter distance than the base 150. The hook surface 177 is configured to opposed a bottom surface of the splice plate 116 when the connector 114 is inserted through the holes 136, 146 in the cable tray sections 112 and splice to attach the cable tray sections together. A second extension section 179 extends from the hook section 176 to a free end of the arm 160. In the illustrated embodiment, the second extensions section 179 is axially aligned with the first extension section 172. However, the second extension section 179 could extend in a different direction without departing from the scope of the disclosure.

The arms 160 are configured to flex inward upon insertion into the holes 136, 146 in the cable tray sections 112 and splice plate 116 to secure the connector 114 to the cable tray sections and splice plate. Ribs 181 on the lower surface 156 of the base 150 reinforce the base and are configured to oppose an upper surface of the base 126 of the cable tray sections 112 when the connectors 114 are attached. The base 150 has a lateral extension which is greater than a width of the holes 136, 146 in the cable tray sections 112 and splice plate 116 to prevent the connectors 114 from being inserted all the way through the cable tray section and splice plate. The hook surface 177 on the hook section 176 of each arm 160 prevents the connector 114 from being pulled back out of the holes 136, 146 in the cable tray sections 112 and splice plate 116.

Referring to FIGS. 13-18, a cable tray assembly of another embodiment is generally indicated at reference numeral 210. The cable tray assembly includes cable tray sections, generally indicated at 212 (two are shown in the illustrated embodiment), a splice plate, generally indicated at 216, and connectors 214 configured to attach the splice plate to the cable tray sections for connecting the cable tray sections together. The cable tray assembly 210 is similar to the cable tray assembly 110 of the previous embodiment. However, rails 224 of the cable tray sections 212 include flanges 290 (broadly, a retainer) extending along a length of the cable tray section. In particular, the flanges 290 extend outwardly (i.e., in an outboard direction) from top and bottom edges of each rail 224. In the illustrated embodiment, the flanges 290 on the top edge of the rail 224 extend downward at an angle, and the flanges on the bottom edge of the rail extend upward at an angle forming a dovetail shaped channel 291 on an exterior or outboard side of the rail. However, the flanges 290 could have other shapes and configurations without departing from the scope of the disclosure.

The splice plate 216 comprises an elongate trapezoidal shaped body 242 configured to be received in the dovetail shaped channels 291 of the cable tray sections 212 to at least temporarily retain the splice plate to the cable tray sections. Pre-formed fastener holes 246 (e.g., round or circular shaped openings) are defined by the body 242 of the splice plate 216 for use in connecting the splice plate to the cable tray sections 212. In the illustrated embodiment, a pair of holes 246 are disposed in the body 242. However, other numbers of holes 246, and holes being located in other positions are envisioned without departing from the scope of the disclosure. Additionally, the splice plate 216 may have other configurations without departing from the scope of the disclosure.

Figure 14:
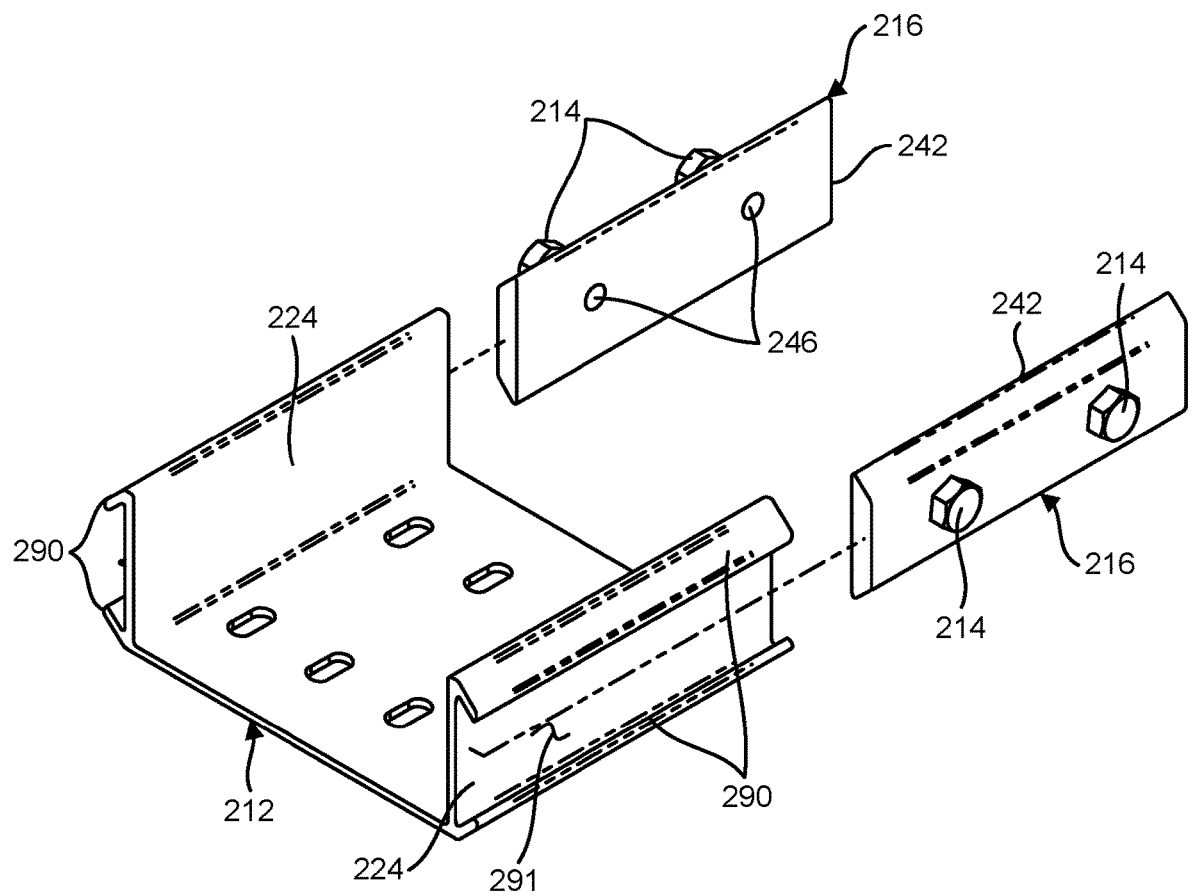
FIG. 14 is an exploded view of a cable tray section and splice plates of the assembly in FIG. 13.
Figure 15:
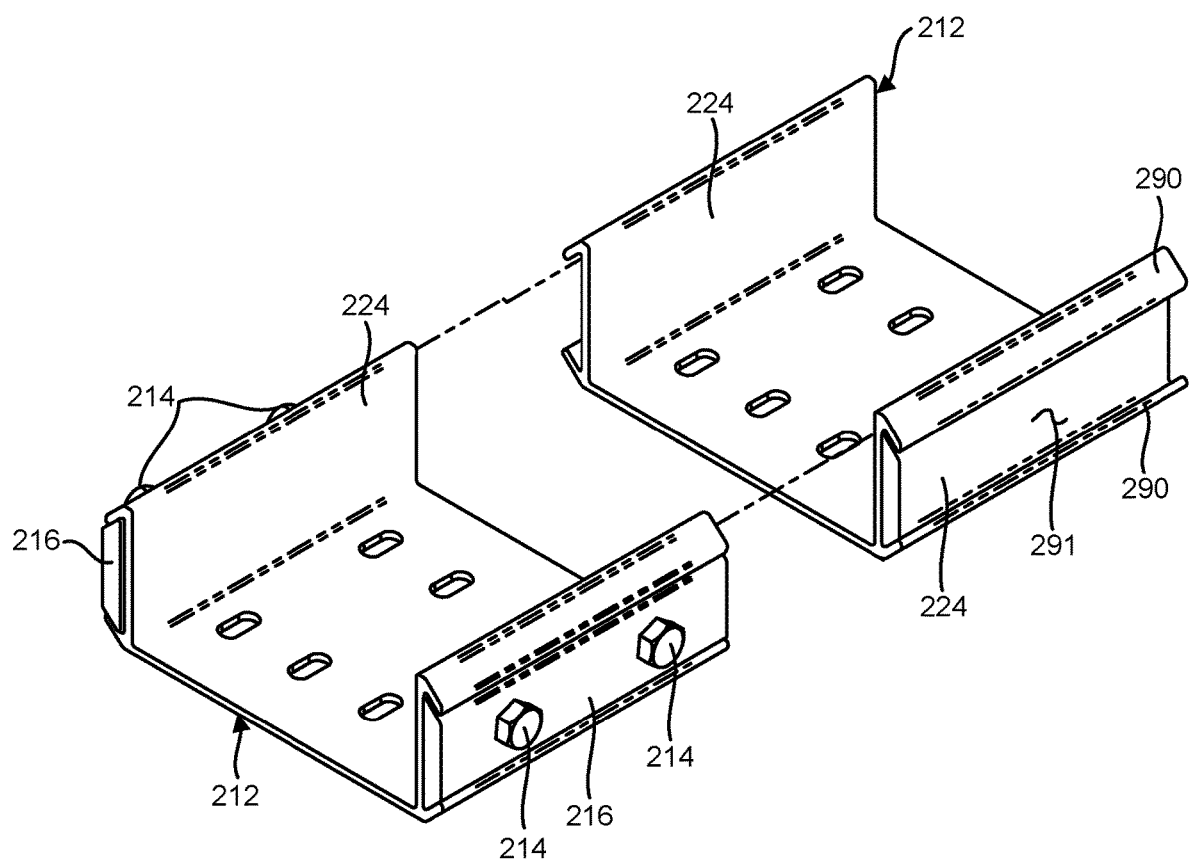
FIG. 15 is a partially exploded view of cable tray sections and the splices plates of the assembly in FIG. 13.
Figure 16:
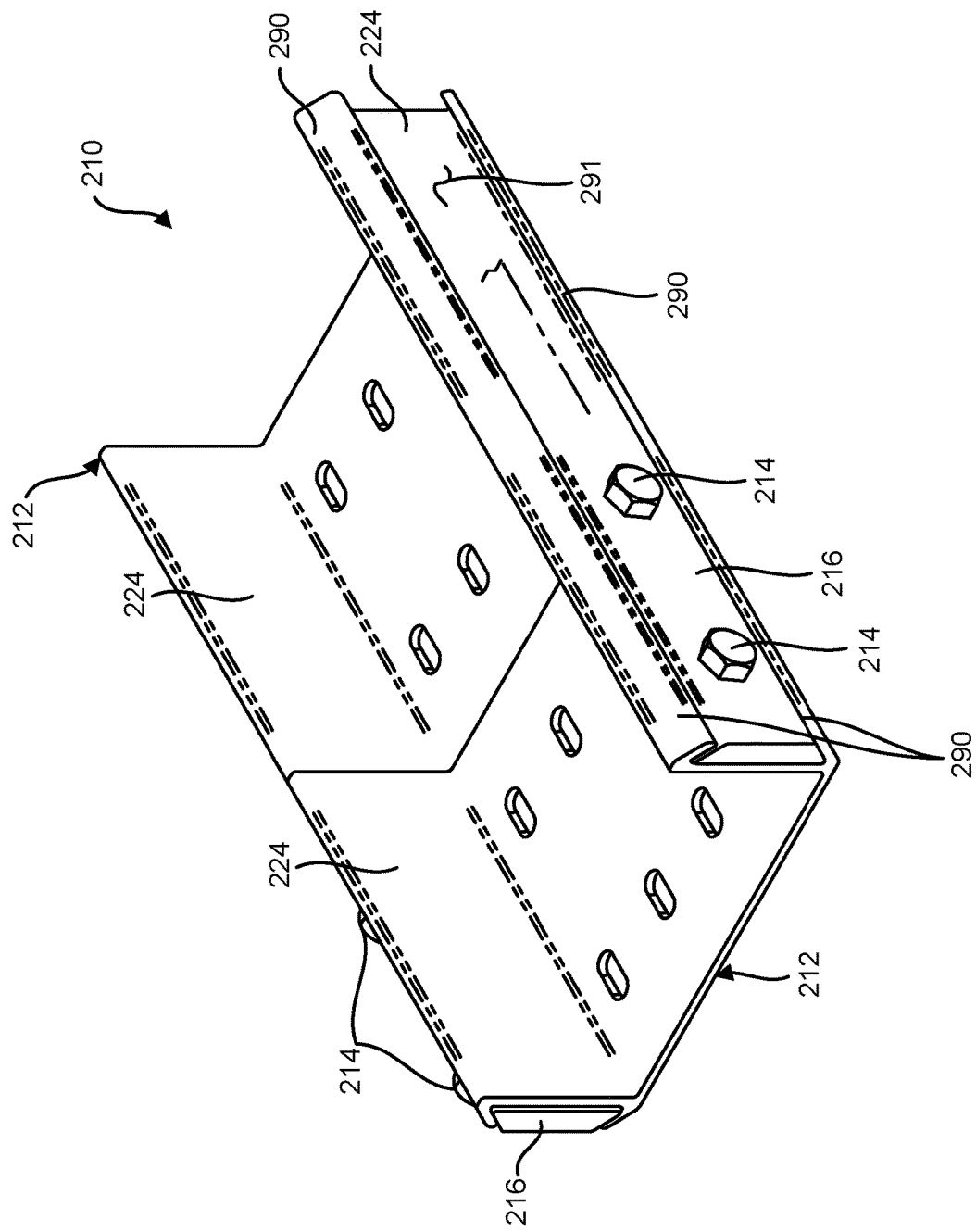
FIG. 16 is a perspective view of the cable tray sections and the splices plates of the assembly in FIG. 13.
Figure 17:
FIG. 17 is an end view of a cable tray section of the assembly in FIG. 13.
Figure 18:
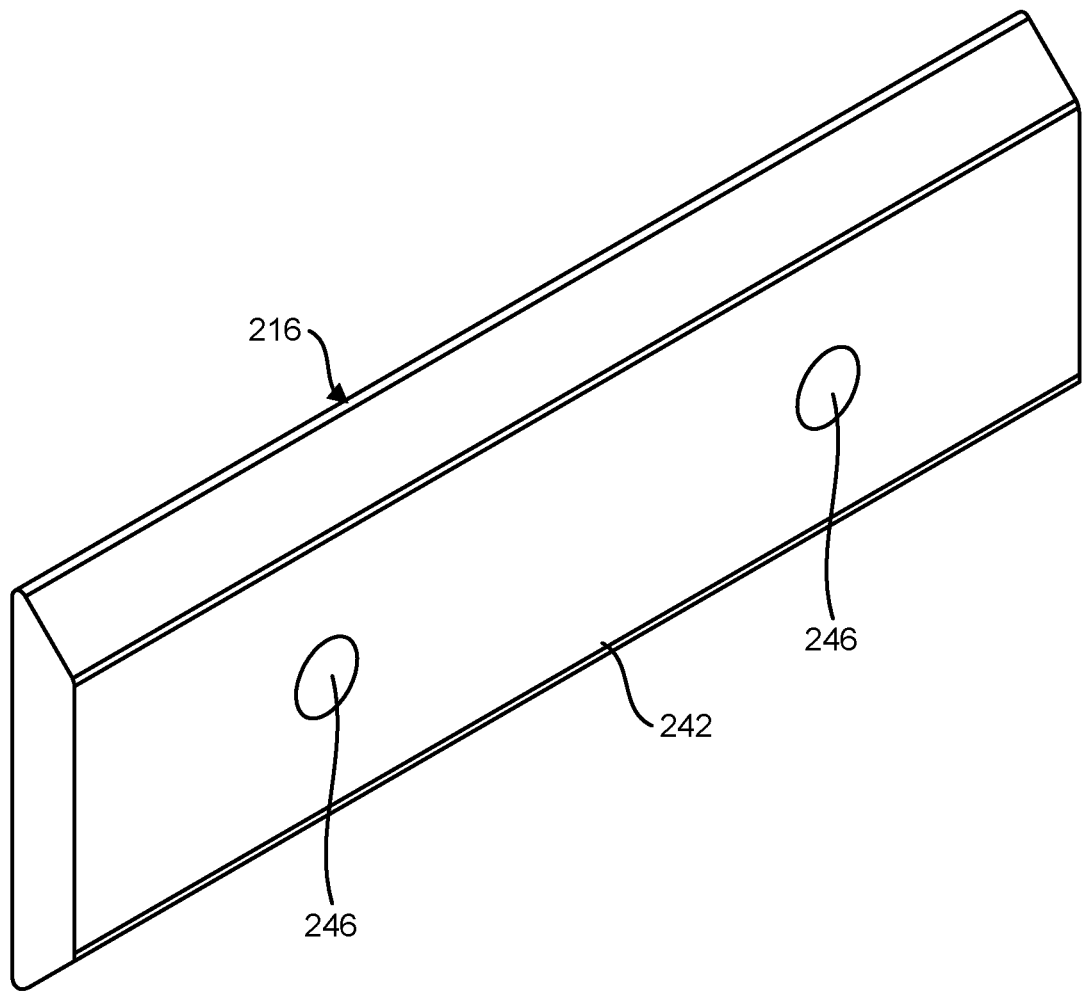
FIG. 18 is a perspective of a splice plate of the assembly in FIG. 13.

The splice plate 216 may be slid into an open end of a channel 291 of one of the cable tray sections 212 (FIG. 14). The cable tray sections 212 may then be brought together such that longitudinal ends of the cable tray sections abut each other (FIG. 15). The splice plate 216 may then be slid within the channel 291 of the cable tray section 212 until the splice plate overlays both cable tray sections such that one hole 246 is in registration with one cable tray section and the other hole 246 is in registration with the other cable tray section (FIGS. 16 and 12). The connectors 214 may be received through the holes 246 to attach the splice plate 216 to the cable tray sections 212. In the illustrated embodiment, the connectors 214 comprise threaded-type fasteners (e.g., bolts). However, the connectors 14 could have other configurations without departing from the scope of the disclosure. The splice plate 216 also provides for attachment or coupling of additional components to the cable tray assembly 10. In particular, the connectors 214 may be inserted through the additional component(s) and then inserted through the holes 246 to attach the component(s) to the cable tray assembly 10 while also attaching the cable tray sections 212 of the cable tray assembly together. It will be understood that the cable tray assembly 10 may be configured without additional components attached thereto without departing from the scope of the disclosure.

Referring to FIGS. 19-24, a cable tray assembly of another embodiment is generally indicated at reference numeral 310. The cable tray assembly includes cable tray sections, generally indicated at 312 (two are shown in the illustrated embodiment), a splice plate, generally indicated at 316, and connectors (not shown) configured to attach the splice plate to the cable tray sections for connecting the cable tray sections together. It will be understood that connectors 14, 14' may be used with cable tray assembly 310. The cable tray assembly 310 is similar to the cable tray assembly 110 of the previous embodiment. However, each rail 324 of the cable tray sections 312 includes a flange 390 (broadly, a retainer) extending laterally outward (i.e., in an outboard direction) from a bottom of the rail. In the illustrated embodiment, the flanges 390 extend generally orthogonally to an upward extension of the rail 324 giving the rail a generally L-shaped cross section or profile. However, the flanges 390 could extend in other directions without departing from the scope of the disclosure. Additionally, a raised section 394 is disposed on the base 326 of each cable tray section 312. In the illustrated embodiment, the raised section 394 extends longitudinally along the base 326 generally at a center of the base. The raised section 394 has a rectangular cross section. However, the raised section 394 could have over configurations without departing from the scope of the disclosure.

Pre-formed fastener holes 336 (e.g., round or oval shaped openings) are defined by the base 326 of each cable tray section 312 for use in connecting the splice plate 316 to the cable tray sections 312. In the illustrated embodiment, the holes 336 are arranged on both sides of the raised section 394 and located near longitudinal ends of the base 326. However, other arrangements for the holes 336 are envisioned without departing from the scope of the disclosure. Openings 337 are formed in the base 326 and extend through raised section 394. The openings 337 are axially aligned and longitudinally spaced along the base 326. In the illustrated embodiment, the openings 337 are circular. However, the openings 337 could have other shapes without departing from the scope of the disclosure.

The splice plate 316 includes a plate body 340 having a generally channel shape including a planar base 342 and a pair of planar flanges 344 extending transversely from longitudinal sides of the base. In the illustrated embodiment, the flanges 344 extend generally orthogonally from the base 342 and include an inwardly extending (i.e., extending in an inboard direction) projection 396. A length of the body 340 may be divided in half whereby one half of the boy is configured to engage one of the cable tray sections 312 and the other half of the body is configured to engage the other of the cable tray sections when the splice plate 316 is attached to the sections. The plate body 340 may be integrally formed as a single, one-piece, monolithically formed component. Alternatively, the plate body 340 may be formed from separate components attached together by suitable means.

Pre-formed fastener holes 346 (e.g., square or rectangular shaped openings) are defined by the base 342 of the splice plate 316 for use in connecting the splice plate to the cable tray sections 312. In the illustrated embodiment, a pair of holes 346 are disposed near each side of the base 342 adjacent the flanges 344. However, other numbers of holes 346, and holes being located in other positions are envisioned without departing from the scope of the disclosure. Posts 347 extend from an upper surface of the base 342 of the splice plate 316. The posts 347 are axially aligned and longitudinally spaced along a center of the base 342 of the splice plate 316. In the illustrated embodiment, the posts 347 comprises cylindrical members. However, the posts could have other shapes and configurations without departing from the scope of the disclosure.

Figure 19:
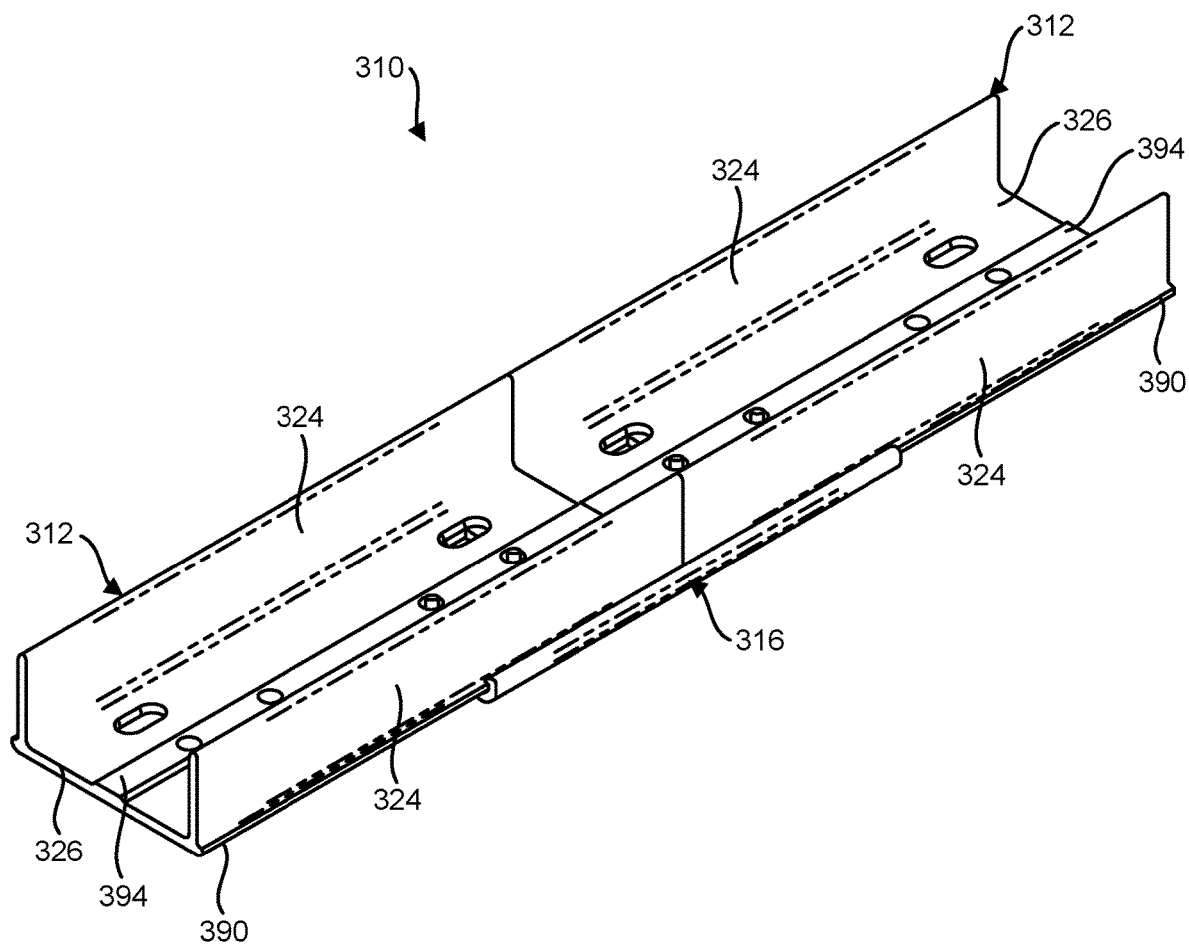
FIG. 19 is a perspective of another embodiment of a cable tray assembly with connectors of the assembly removed.
Figure 20:
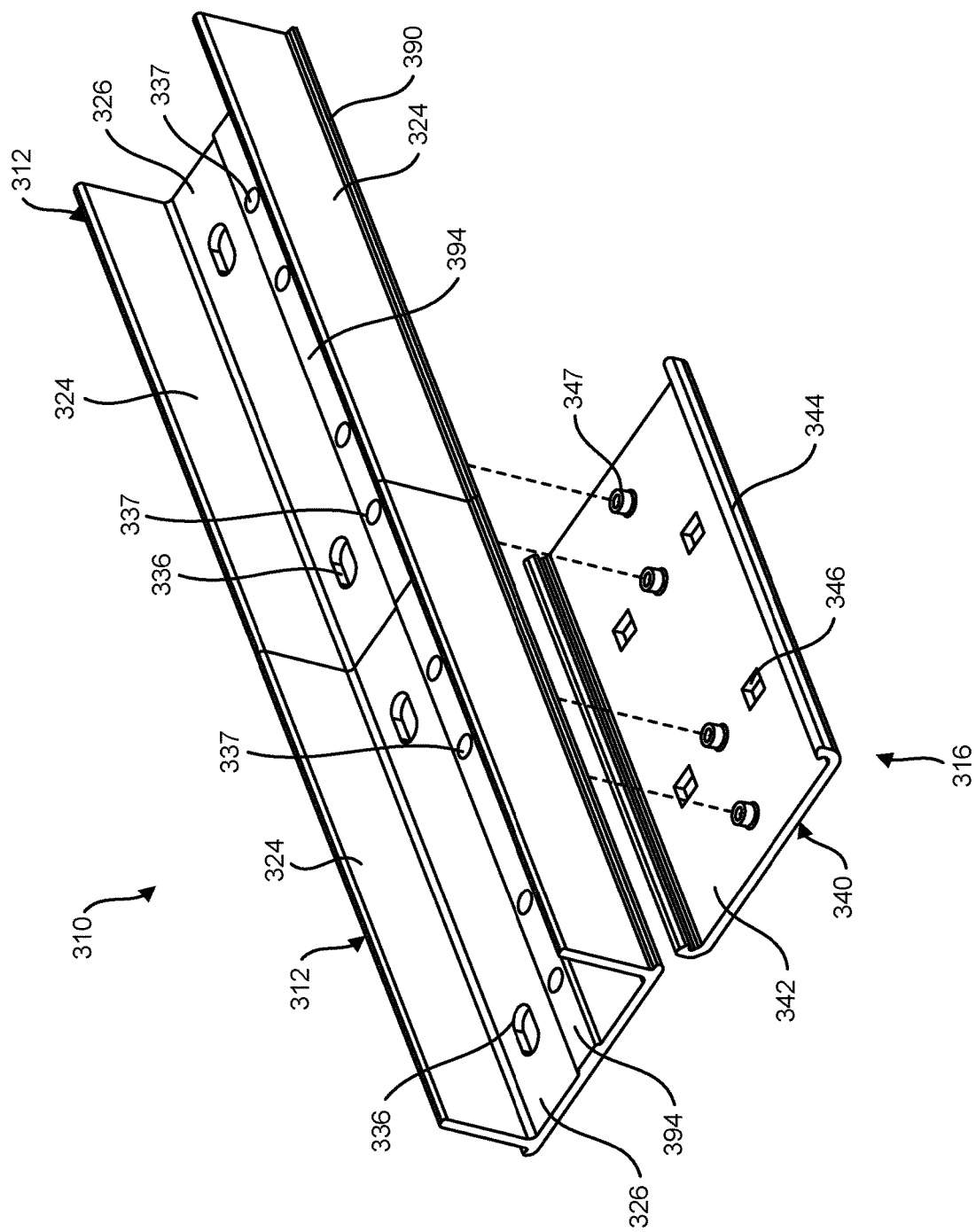
FIG. 20 is a partially exploded view of the assembly in FIG. 19.
Figure 21:
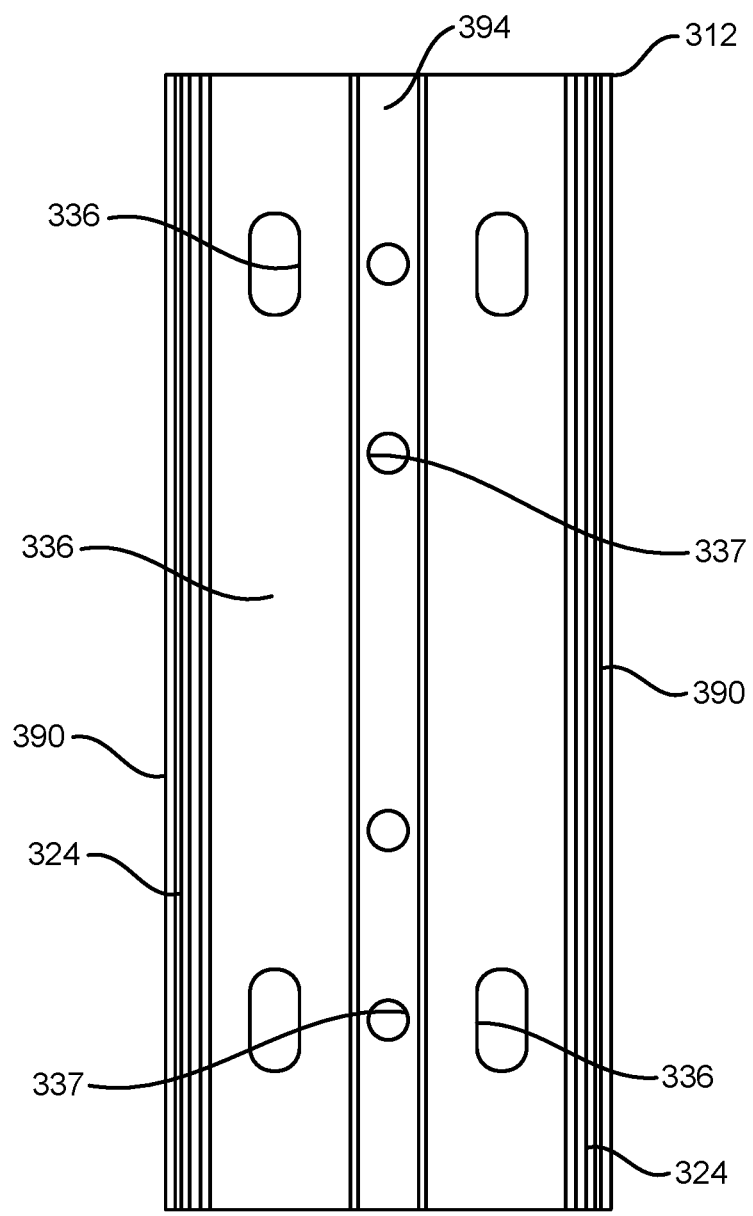
FIG. 21 is a top view of a cable tray section of the assembly in FIG. 19.
Figure 22:
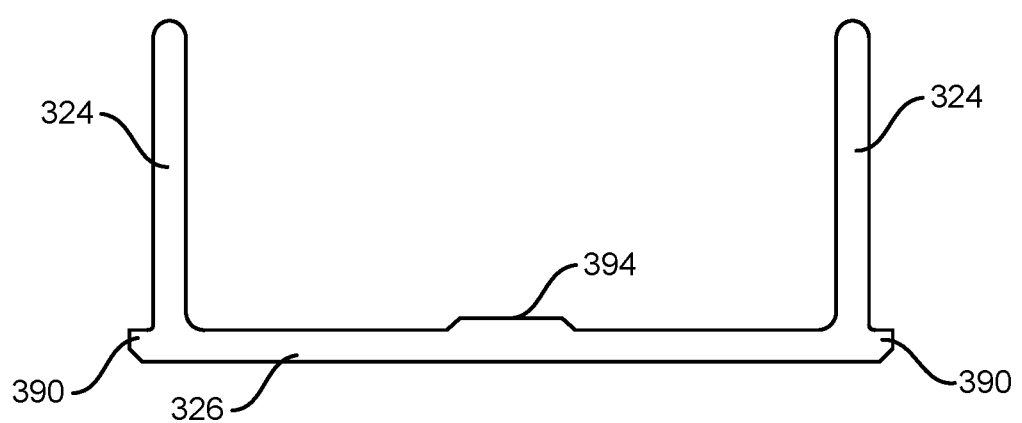
FIG. 22 is an end view of the cable tray section in FIG. 21.
Figure 23:
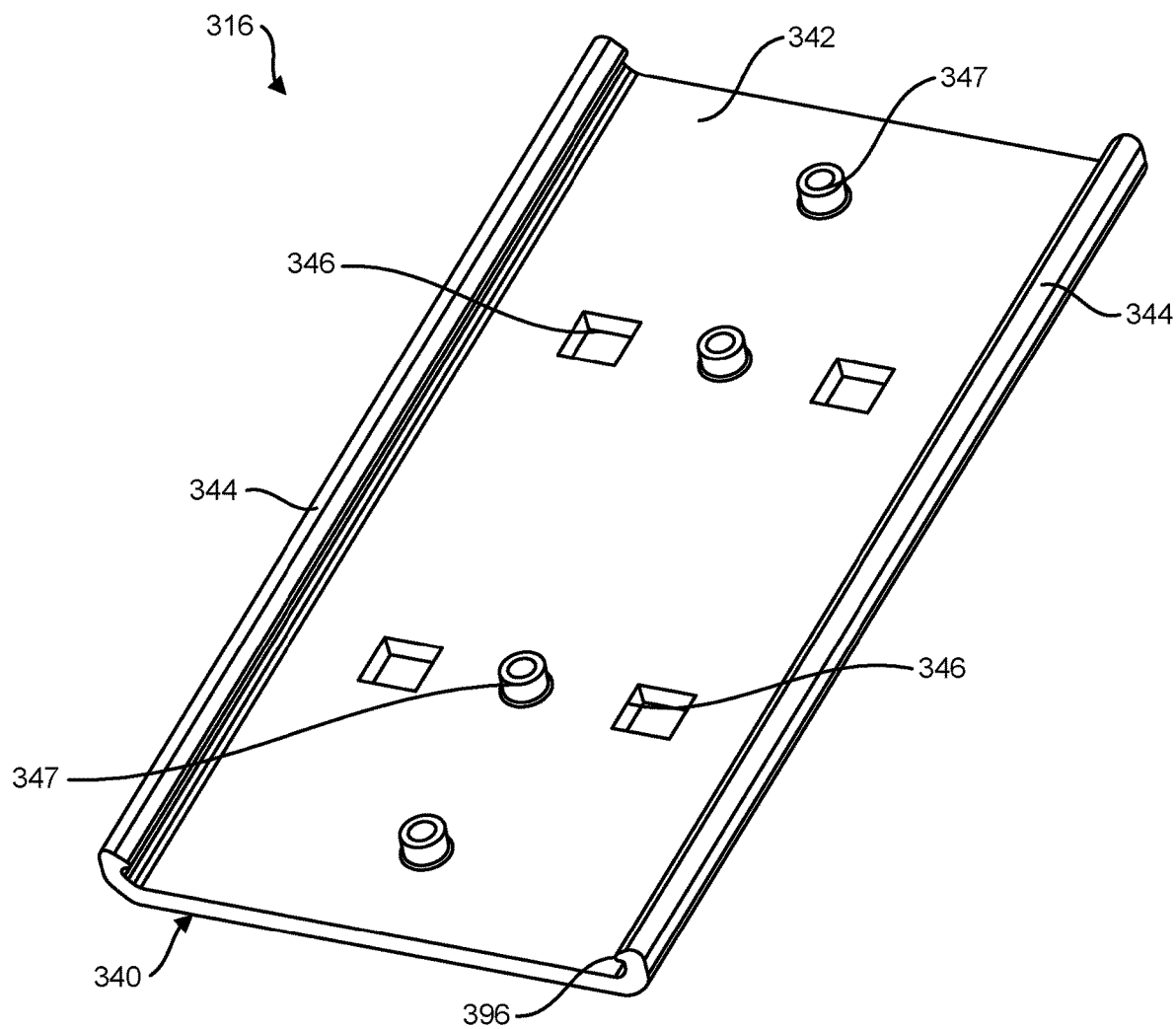
FIG. 23 is a perspective of a splice plate of the assembly in FIG. 19.
Figure 24:
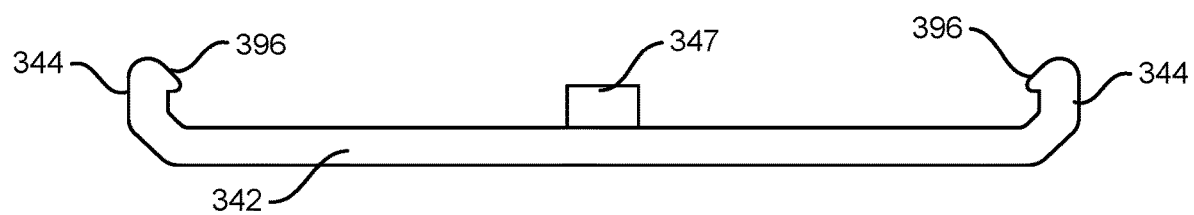
FIG. 24 is an end view of the splice plate in FIG. 23.

Referring to FIGS. 19 and 20, in one method of assembling the cable tray assembly 310, the longitudinal ends of the cable tray sections 312 are brought together so that the rails 324 and bases 326 are generally abutted. The splice plate 316 is positioned on the cable tray sections 312 so that the splice plate at least partially receives end portions of the cable tray sections within the channel of the splice plate body 340. The posts 347 on the splice plate 316 are configured to be inserted into respective ones of the openings 337 in the cable tray sections 312 to locate the splice plate 316 relative to the cable tray sections. The raised section 394 provides additional material on the base 326 of the cable tray section 312 to support the posts 347 as they are inserted into the base. Continued insertion of the posts 347 into the openings 337 causes the flanges 344 on the splice plate 316 to engage the bottom of the flanges 390 on the cable tray sections 312 causing the flanges 344 to flex outwardly to snap around the flanges 390 to secure the splice plate to the cable tray sections. Once the posts 347 are fully inserted into the openings 337 and the splice plate 316 is clipped to the cable tray sections 312, the body 340 of the splice plate engages the cable tray sections such that an upper surface of the base 342 of the body lies flush against bottom portions of cable tray sections, and the projections 396 on the flanges 344 oppose the projections 390 on the flanges 324 to retain the splice plate to the cable tray sections. In this position, the holes 346 in the base 342 of the splice plate 316 are aligned with corresponding holes 336 in the cable tray sections 312 so that the connectors may be received through the holes to attach the splice plate to the cable tray sections. The splice plate 316 is secured to the cable tray sections 12 by inserting the connectors into the aligned holes 336, 346 in the cable tray sections 312 and splice plate 316 thereby attaching the cable tray sections together.

Modifications and variations of the disclosed embodiments are possible without departing from the scope of the invention defined in the appended claims.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A cable tray assembly comprising:
   a cable tray section including a base and rails extending transversely from longitudinal sides of the base, at least one of the rails including a retainer projecting laterally on the rail;
   a splice plate configured to engage the retainer on the cable tray section such that the splice plate is retained to the cable tray section by the retainer; and
   a connector configured to attach the splice plate to the cable tray section;
   wherein the retainer comprises a first flange extending laterally from a top of said at least one of the rails at a downward angle, and a second flange extending laterally from a bottom of said at least one of the rails at an upward angle toward the first flange forming a dovetail shaped channel extending along an exterior of said at least one of the rails.

2. The assembly set forth in claim 1, wherein the flanges extend along an entire length of said at least one of the rails.

3. The assembly set forth in claim 1, wherein the connector comprises a thread-type fastener for coupling an additional component to the cable tray assembly when the splice plate is attached to the cable tray section.

4. The assembly set forth in claim 1, wherein the splice plate has a trapezoidal shape configured to be received in the dovetail shaped channel to retain the splice plate to the cable tray section.

* * * * *